United States Patent
Tørres et al.

(10) Patent No.: US 9,758,959 B2
(45) Date of Patent: Sep. 12, 2017

(54) METHOD AND DEVICE FOR DRAINAGE AND DETECTION OF LEAKAGE

(71) Applicant: Aker Engineering & Technology AS, Lysaker (NO)

(72) Inventors: Kjell Tørres, Oslo (NO); Keith N. Charles, Lymington (GB)

(73) Assignee: Aker Engineering & Technology AS, Lysaker (NO)

( * ) Notice: Subject to any disclaimer, the term of this patent is extended or adjusted under 35 U.S.C. 154(b) by 296 days.

(21) Appl. No.: 14/649,006

(22) PCT Filed: Dec. 20, 2013

(86) PCT No.: PCT/EP2013/077658
§ 371 (c)(1),
(2) Date: Jun. 2, 2015

(87) PCT Pub. No.: WO2014/102186
PCT Pub. Date: Jul. 3, 2014

(65) Prior Publication Data
US 2015/0315778 A1 Nov. 5, 2015

(30) Foreign Application Priority Data
Dec. 27, 2012 (NO) .................................. 20121554

(51) Int. Cl.
*B01D 53/02* (2006.01)
*E04H 7/18* (2006.01)
(Continued)

(52) U.S. Cl.
CPC ........ *E04B 1/7038* (2013.01); *B01D 53/1475* (2013.01); *B65D 90/046* (2013.01);
(Continued)

(58) Field of Classification Search
CPC .......... E04H 7/06; E04H 7/16; B01D 53/1475
(Continued)

(56) References Cited

U.S. PATENT DOCUMENTS

| 1,433,315 A | 10/1922 | Wales |
| 5,248,220 A | 9/1993 | Rohringer |

(Continued)

FOREIGN PATENT DOCUMENTS

| DE | 4232493 A1 | 3/1994 |
| GB | 2119843 A | 11/1983 |

OTHER PUBLICATIONS

Stefanescu, Radu, "International Search Report," prepared for PCT/EP2013/077658, as mailed May 9, 2014, four pages.

*Primary Examiner* — Robert A Hopkins
(74) *Attorney, Agent, or Firm* — Winstead PC

(57) ABSTRACT

A method for providing a drainage from a space between a lined concrete wall and a lining for protecting the lined concrete wall, wherein the method comprises the steps of arranging one or more draining member(s) each comprising a draining pipe having a blind flange arranged at both ends and having a length including the blind flanges that is substantially equal to the wall thickness in a casting frame so that the blind flanges are resting at the casting frame at the inside of the wall and the outside of the wall, respectively; filling concrete filled into the casting frame to cover the draining member(s) and allowing the concrete is allowed to cure; removing the casting frame from at least one of the sides of the concrete wall and; drilling through the blind flanges to open the draining member(s). A drained concrete wall and a concrete vessel are also described.

7 Claims, 4 Drawing Sheets

(51) Int. Cl.
  *E04B 1/70* (2006.01)
  *B01D 53/14* (2006.01)
  *E02D 19/00* (2006.01)
  *B65D 90/04* (2006.01)
  *B65D 90/50* (2006.01)

(52) U.S. Cl.
  CPC ............ *B65D 90/50* (2013.01); *E02D 19/00* (2013.01); *E04H 7/18* (2013.01); *B01D 2257/504* (2013.01); *Y02C 10/06* (2013.01)

(58) Field of Classification Search
  USPC .......................................................... 95/139
  See application file for complete search history.

(56) References Cited

U.S. PATENT DOCUMENTS

| | | |
|---|---|---|
| 5,634,311 A | 6/1997 | Carlton |
| 9,441,389 B2 * | 9/2016 | Shiomi .................... E04H 7/06 |
| 2006/0278289 A1 | 12/2006 | Robinson |

\* cited by examiner

METHOD AND DEVICE FOR DRAINAGE AND DETECTION OF LEAKAGE

TECHNICAL FIELD

The present invention relates to drainage and detection of leakage in a lining used for large industrial columns, such as an absorption column for a $CO_2$ capture plant.

BACKGROUND ART

Post combustion carbon capture plants, or plants for capturing CO2 from an exhaust gas from an industrial plant, such as a thermal power plant producing electrical power and/or heat by combustion of carbonaceous fuels, are physically large constructions due to the volume of exhaust gas to be treated.

An absorption column for a 400 MW gas fired power plant has typically an absorber having a cross section of more than 300 $m^2$, and a height of 50-60 meters. Due to the size thereof, concrete is a building material of interest, as large constructions like such an absorber may be built at a reasonable cost and will have an acceptable life expectancy.

To provide a life expectancy of 30 years or more, which is the normal requirement set for such plants, the inner walls of the absorption column, is normally to be lined with a protecting liner, such as a liner of polymer material. A liner of a polymer material, such as a polyolefin, will normally be produced in panels that welded together to make up a watertight inner wall of the column. Apertures in the inner liner wall are made watertight by welding liners into tubing and other apertures connected to the inner of the absorber column.

In the casting process, slip form will normally be used, as this is an efficient and cost effective way of constructing such a column. The lining may then be a part of or all of the inner formwork that will remain in the position after the finishing of the slip form. Preferably, anchors are present on the surface of the liner panels facing the concrete to anchor the panels to the concrete surface.

Leakage may, however, occur in the liner, caused either by welding defects, damages or by physical stress to parts of the liner. The absorbent used in $CO_2$ capture plants is normally an aqueous solution of one or more chemicals absorbing $CO_2$, such as amine(s). If leakages occur, the aqueous solution will enter into a narrow, and possibly imperfect, space formed between the concrete surface and the liner. The aqueous solution will trickle downwards. Since there is no bond between the lining and the concrete surface, projections as corbels will not stop the solution to continue to the bottom floor level.

As soon as the tickling liquid is stopped by meeting the bottom of the absorber column or any other means stopping the liquid to tickle downwards, a liquid column of substantial height may be build up between the concrete wall and the liner, a liquid column that may cause a substantial force separating the concrete wall and the liner. This separating force may break the anchorage between the concrete wall and the liner and may eventually cause the liner to break into the column, as there is no counterforce preventing this.

U.S. Pat. No. 5,248,220 relates to a liner sheet, liner panel system and a method for making the same that provides continuous passages between the liner and a lined liquid containment structure, such as a tank, towers, sewage pipes etc., for detection of leakage and for draining leakage by providing a sensor in a drainage tube. Drainage tubes are provided through the walls of the walls of the structure.

DE 4232493 relates to a lined concrete or steel tank, and a method for production of the same. Any liquid leaked into the space between the lining and the tank is drained into channels below the bottom part of the tank.

Large tanks or towers for chemical processes made of concrete is often produced by slide moulding, i.e. a moulding process where cement is substantially continuously poured onto the top of a casting mould, and where the casting mould is slided upwards as the cement at the lower part thereof is set. The above identified prior art is silent how to provide drainage tubes through cement walls in the casting process.

An object of the present invention is therefore to provide a method for providing a fluid connection from the space between a lining and walls of a lined tank, column, tower or the like, for detection of liquid leakage through the lining and for drainage of any liquid trapped between the lining and the walls.

Another object is to provide a method and device for detecting leakage of absorbent from the inner of an absorber tower into the space between the inner walls of an absorber tower and a liner, to be able to detect and localize a leakage to be able to consider a time for doing a repair, and to identify which part of the column the leakage is situated.

SUMMARY OF INVENTION

According to a first aspect, the present invention relates to a A method for providing a drainage from a space between a lined concrete wall and a lining for protecting the lined concrete wall, wherein the method comprising the steps of:

arranging one or more draining member(s) each comprising a draining pipe having a blind flange arranged at both ends and having a length including the blind flanges that is substantially equal to the wall thickness in a casting frame so that the blind flanges are resting at the casting frame at the inside of the wall and the outside of the wall, respectively, filling concrete filled into the casting frame to cover the draining member(s) and allowing the concrete is allowed to cure, removing the casting frame from at least one of the sides of the concrete wall, drilling through the blind flanges to open the draining member(s).

Introduction of one or more draining member(s) bridging the inside and outside of the concrete wall, where the draining comprises a draining pipe provided with blind flanges, makes it possible to insert the member(s) without risking that the pipe is filled with concrete during the concreting operation. By using a material that does not adhere to the concrete, the blind flanges will be visible at the concrete surface on removal of the casting frame, and will be available for drilling.

Independent if the lining is used as casting frame at one side of the wall, the draining member will only rest onto the lining after the work has been finished, allowing water or aqueous solutions to be drained through the drain pipe. Even if the draining member is forced against the lining, liquid being a result of a leakage through the lining will build up a liquid pressure that will widen the gap between the lining and the draining member to allow draining of the liquid.

According to one embodiment, the casting frame of the side of the wall to be lined is the lining. Using the lining as a casting frame will improve the matching of the lining and the inner wall of the concrete wall casted. The skilled man will, however, understand that it may be necessary to strengthen the lining during the casting procedure by means of temporary enforcement that is removed after curing of the concrete.

According to one embodiment, both of the blind flanges are drilled from one side. Drilling both flanges from one side reduces the number of operations for the preparation of the concrete construction. If the lining is used as casting frame, drilling from one side may be necessary, both as it may be unwanted to drill trough the lining, and as it may be difficult and even impossible to localize the blind flanges and draining member through the lining.

According to an embodiment, a connection pipe for withdrawing liquid collected in the draining member, is inserted into the drill hole in the outside wall, and is welded to the blind flange. The blind flanges of the draining member will be flush with the concrete surface. A connection pipe connected to the drill hole at the outside of the wall will make it possible to avoid that any drained aqueous solution is flowing down at the outer surface of the concrete wall, but may be collected.

Preferably, a collection pipe is connected to one or more connection pipe(s) for collection of drained liquid. By connecting the connection pipe(s) to a collection pipe, liquid being drained from two or more draining members may be collected and led to a common tank or the like for spillage collection.

According to another aspect, the present invention relates to a draining member for a concrete wall to be inserted into the concrete during the concreting operation, wherein the draining member comprises a draining pipe having a blind flange at each end, and where the total length of the draining member is substantially equal to the thickness of the concrete wall at the point of insertion.

According to a third aspect, the present invention relates to a vessel comprising an outer concrete wall provided with a lining on its inner surface to protect the concrete walls for the environment inside of the vessel, wherein one or more draining member(s) as described above is (are) provided through the lower part of the concrete wall and where holes are provided through the blind flanges of the draining members.

The vessel described above, may be an absorber tower for a $CO_2$ capture plant.

DETAILED DESCRIPTION OF THE INVENTION

Figure 1:
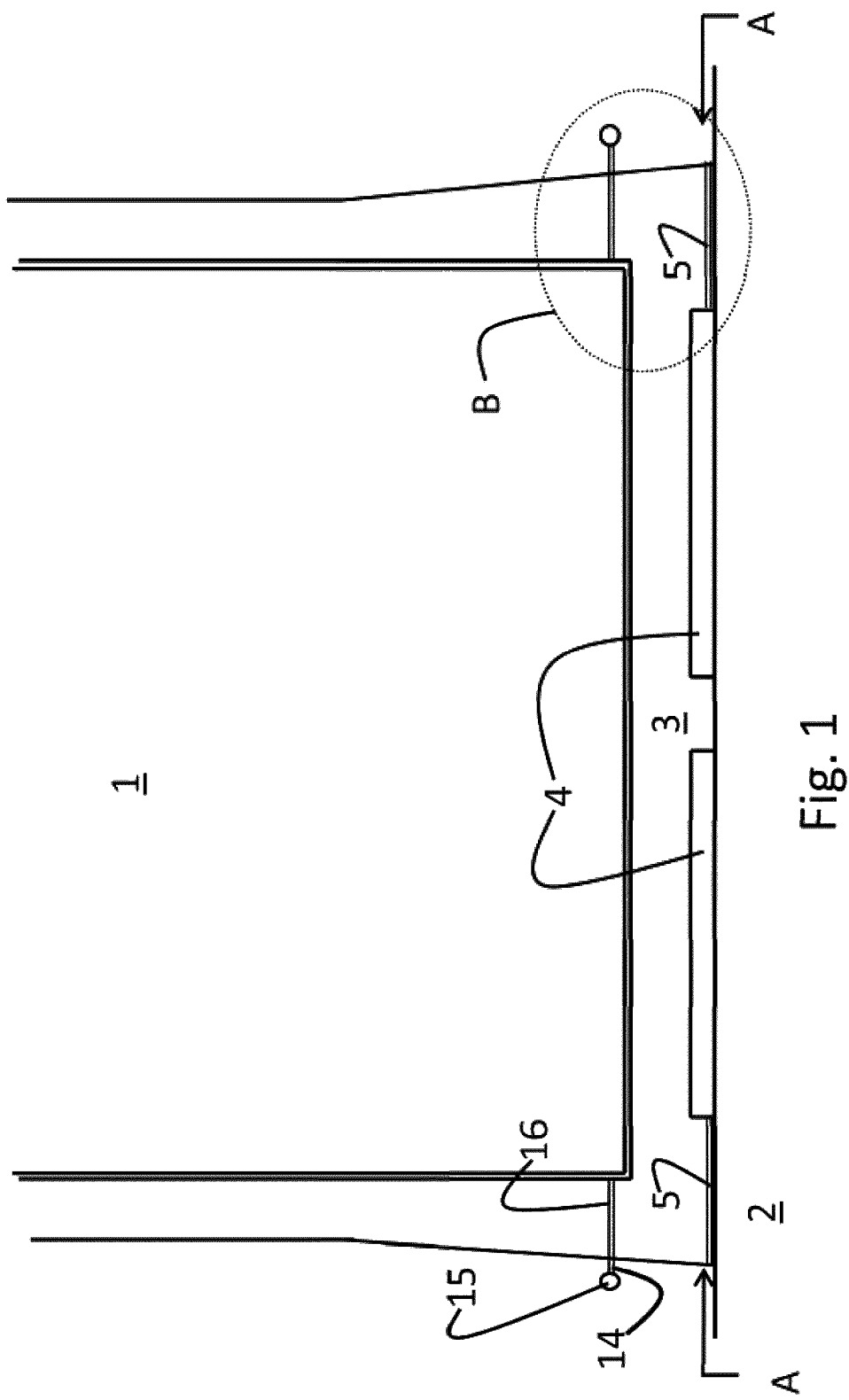
FIG. 1 is a vertical section through the lower part of a absorption tower of $CO_2$ capture.
Figure 2:
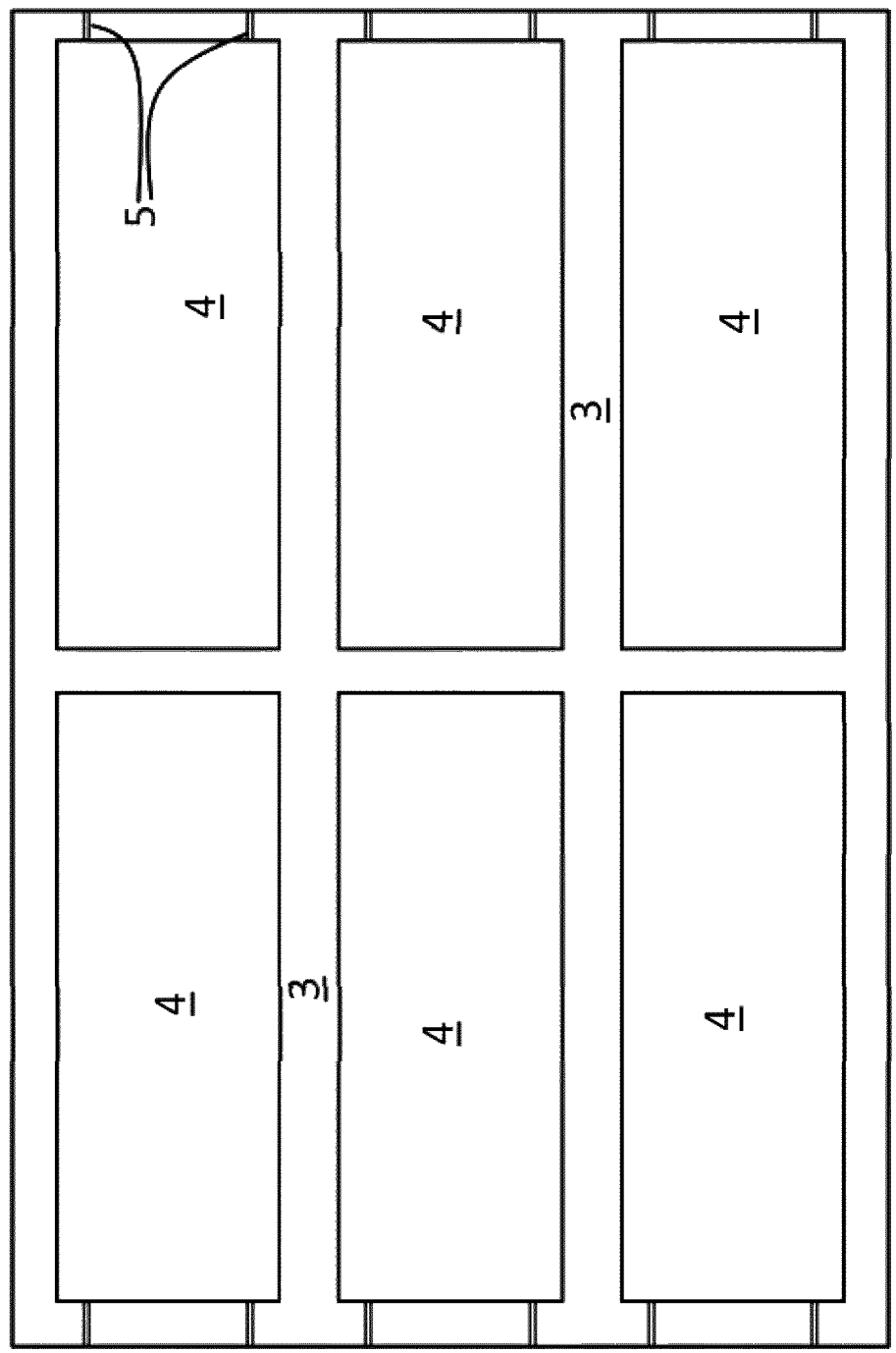
FIG. 2 is a cross section along A-A of FIG. 1, and
FIGS. 3 and 4 are enlarged views of the section marked with B in FIG. 1, in two different stages of completion.
Figure 3:
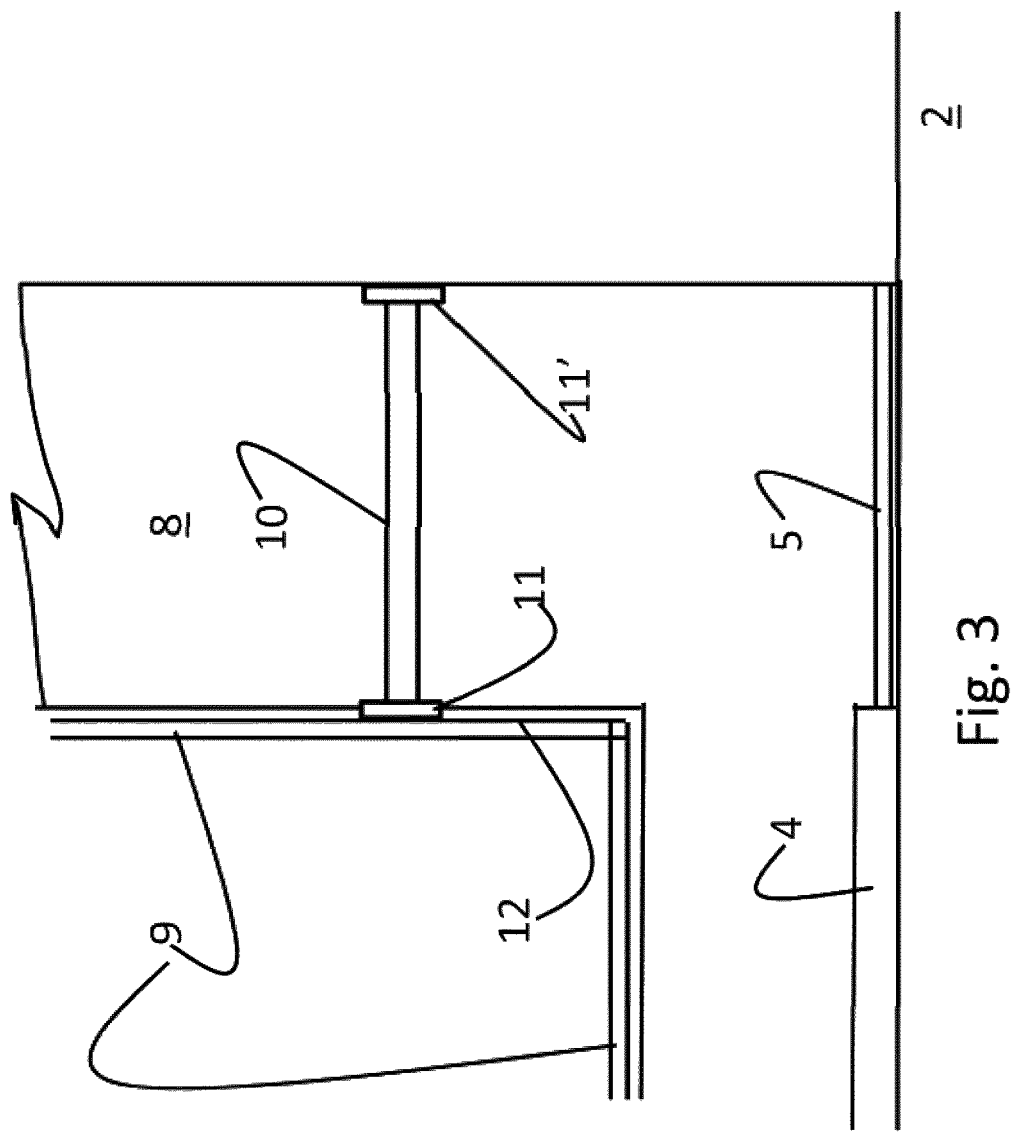
Figure 4:
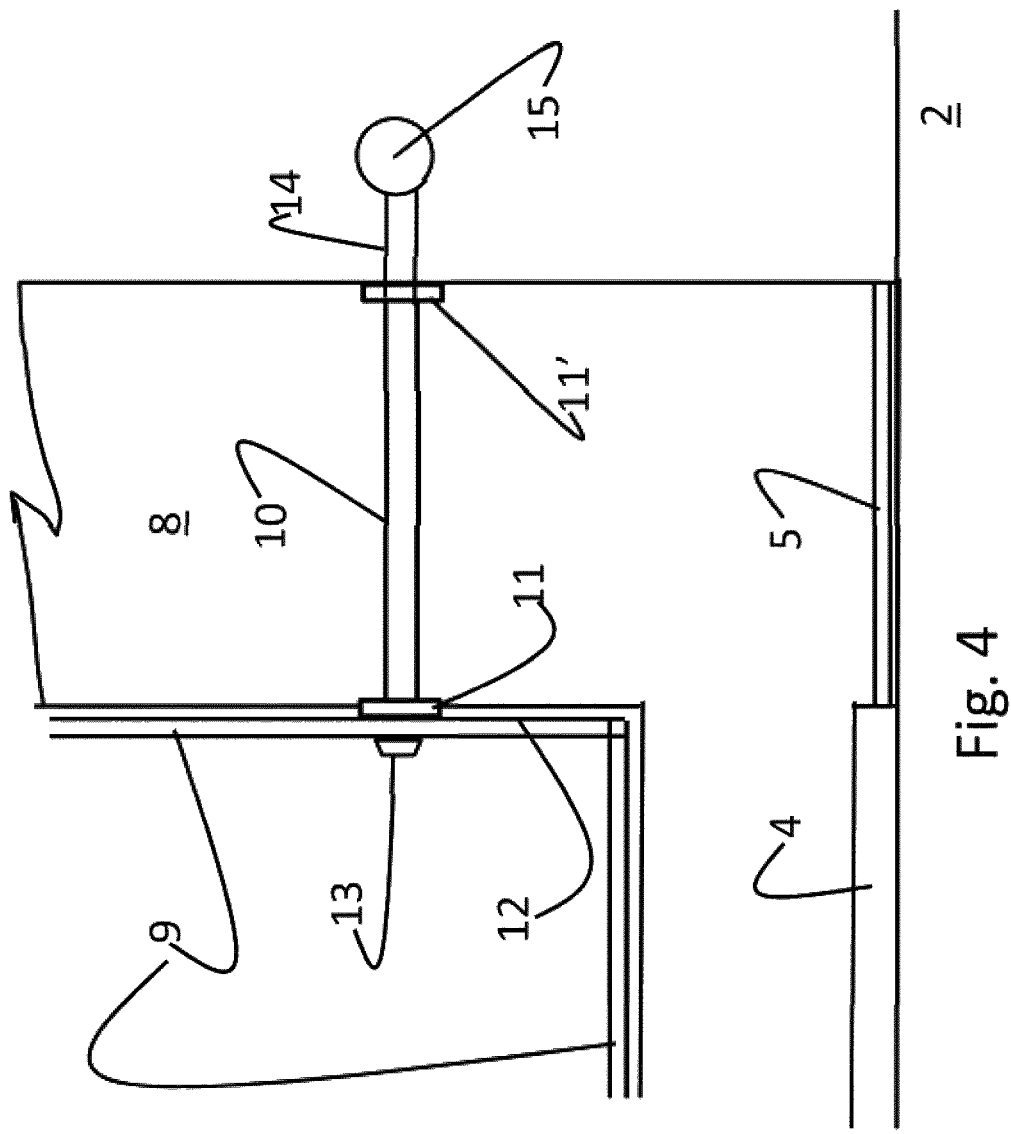

A full-scale absorber column for a $CO_2$ capture plant contains a large volume of liquid absorbent, such as an aqueous amine solution. The volume may exceed 500 m$^3$, depending on volume of exhaust gas to be treated. To avoid spillage of amine into the surroundings in case of leakage from the absorber, the bottom part of the absorber is surrounded by a bund having capacity sufficient for all of the absorbent in the absorber. FIG. 1 is a horizontal section through the bottom part of an absorber 1, resting on a foundation slab 2 of the bund, whereas FIG. 2 illustrates a cross section along A-A of a base part 3 of the absorber 1 that is resting at and connected to the foundation slab 2 of the bund.

The bottom 2 of the tray is substantially flat and substantially horizontal, and the base part 3 of the absorber constructed at the top of the foundation slab of the bund. To avoid that any cracks in the base part 3 continues into the bottom of the bund, draining chambers 4 are provided in the base part. The draining chambers are chambers formed at the top of the foundation slap 2, each draining chamber connected to one or more drainage pipes 5 for draining any liquid entering the drainage chambers into the tray.

The drainage chambers 4 are conveniently formed by arranging elements of a draining material, or a material that maintains its shape during the concreting and curing of the concrete, but that disintegrates if exposed aqueous solutions, such as aqueous absorbents. When concreting the base part, the elements for forming the drainage chamber are arranged in any convenient pattern at the bottom 2 of the tray, leaving space between the elements for filling in concrete to give the required strength and stiffness of the bottom part to obtain the required strength for supporting the absorber column. Drainage pipes 5 are arranged from the mentioned draining or disintegrating elements and to the outside of the base part to allow drainage of the chambers, before the bottom part is casted.

An exemplary material for the mentioned elements is Dufaylite Clayboard®, a material that is marketed as a material for clay heave protection for ground slabs in house building. This material withstands the forces during concreting and disintegrates when exposed to water or an aqueous solution.

If a crack in the base part of the absorber results in a leakage, the leakage will soon be discovered by observing the bottom of the bund for any absorbent coming out of the draining pipes 5. Accordingly, relevant measures may be taken to repair the defects.

After finishing the base part 3, the remaining absorber column is concreted, preferably by slip forming and preferably by using elements for forming a lining 9 as an inner formwork. The concrete has no, or little, adhesion to the surface of the liner. Therefore, the lining elements are preferably provided with not shown anchor elements or studs that are concreted into the concrete walls 8 during this operation and thus give some adherence between the liner and the concrete wall. The lining elements are preferably welded together afterwards to form a watertight wall. Accordingly, the liner wall is built at the top of the existing liner wall during the slip forming process.

Draining members 16, comprising draining pipes 10 with blind flanges 11, 11' has a total length corresponding to the concrete wall thickness are put into the slip form in a predetermined pattern, each resting against the lining at one end, and towards the slip form at its other end. The skilled person will understand that the draining members, i.e. drainpipes and blind flanges, preferably are made by the same material. Convenient materials for the draining members are polymers, such as e.g. polyethylene, polypropylene or any other convenient polymer material, such as any material that may be used for the lining. Most polymer materials will not adhere to the concrete.

As soon as the concrete has cured and the slip form has been moved upwards, the blind flanges will be visible at the outer surface of the absorber column. The draining members 16 may then be opened by drilling, through the visible blind flange 11', and then through the blind flange 11 resting at the lining to open the blind flange towards the lining. Dependent on the thickness of the lining, the drill may go through the lining, or it may be necessary to drill through the lining to ascertain that the drill has reached through the blind flange. If so, a plug cap 13 is introduced into the hole in the lining and welded to avoid leakage.

A connection pipe 14 is introduced into the draining member from the outside wall and is welded to the drainpipe. The connection pipe 14 is again connected to a collection pipe that may be connected to two or more collection pipes 14 each collecting drained liquid from draining members 16.

As the flange 11 resting towards the lining is not welded to the lining and the connection is not liquid tight, any leakage from the inner of the absorber column into the space 12 formed between the lining and the concrete wall may escape through the drainage pipe. Accordingly, leakage in the lining resulting liquid collected in the space 12 will be drained to avoid building up any liquid pressure in the space 12 that may be damaging to the lining as mentioned above. Even if the passage between the flange 11 and the inner wall of the lining may be tight, any building up of liquid pressure within the space 12, will open the passage, and result in drainage. The surface of the blind flange 11 facing the liner may if deemed necessary, may have a surface pattern allowing aqueous solutions to pass between the flange 11 and the lining.

Any leakage of the lining resulting in absorbent being trapped in the space 12 can thus be discovered by monitoring the drainage of liquids from the space 12 via the draining members 16. By monitoring through which drain pipes the aqueous absorbent is drained, by means of any suitable monitoring means known by the skilled person, it will be possible for the skilled person coarsely to predict where to find the point of leakage through the lining.

Alternatively or additional to monitoring each individual draining member 16 for the presence of liquid therein, valves may be provided in collection pipes 15 so that some valves are open and other or closed and observer where liquid is collected, and the volume per time unit collected. By monitoring the development and the liquid collection from single draining members or draining members in different sections of the absorber walls, it is possible to make estimation on the localization of the leakage. Even though such estimations are relative inexact, they give a good estimation for the planning of corrective measures, such as repairing the lining. Even if not too accurate, such estimation may give a sufficiently good estimation on the localization of the leakage and the extent thereof for planning of the corrective measures.

The invention claimed is:

1. A method for providing a drainage from a space between a lined concrete wall and a lining for protecting the lined concrete wall, the method comprising:
    arranging at least one draining member, each comprising a draining pipe having a blind flange arranged at both ends and having a length including the blind flanges that is substantially equal to the wall thickness in a casting frame, so that the blind flanges are resting at the casting frame at the inside of the wall and the outside of the wall, respectively;
    filling concrete into the casting frame to cover the at least one draining member and allowing the concrete to cure;
    removing the casting frame from at least one of the sides of the concrete wall; and
    drilling through the blind flanges to open the at least one draining member.

2. The method of claim 1, wherein the casting frame of the side of the wall to be lined is the lining.

3. The method of claim 1, wherein both of the blind flanges are drilled from one side.

4. The method of claim 1, wherein at least one connection pipe for withdrawing liquid collected in the at least one draining member, is inserted into the drill hole in the outside wall, and is welded to the blind flange.

5. The method of claim 2, wherein a collection pipe is connected to at least one connection pipe for collection of drained liquid.

6. A vessel comprising:
    an outer concrete wall provided with a lining on its inner surface to protect the concrete walls for the environment inside of the vessel;
    at least one draining member comprising a draining pipe having a blind flange at each end and a total length substantially equal to the thickness of the concrete wall at the point of insertion, through the lower part of the concrete wall; and
    wherein holes are provided through the blind flanges of the at least one draining member.

7. The vessel according to claim 6, wherein the vessel is an absorber tower for a $CO_2$ capture plant.

* * * * *